(12) United States Patent
Roll

(10) Patent No.: US 6,387,259 B1
(45) Date of Patent: May 14, 2002

(54) SPIN-ON FILTER ASSEMBLIES

(75) Inventor: Mark Allen Roll, Bessemer, NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/722,052

(22) Filed: Nov. 27, 2000

(51) Int. Cl.⁷ .......................... B01D 27/08; B01D 35/34
(52) U.S. Cl. ................. 210/232; 210/443; 210/DIG. 17
(58) Field of Search ................................ 210/232, 440, 210/443, 444, 450, DIG. 17; 215/330, 356; 220/288, 304

(56) References Cited

U.S. PATENT DOCUMENTS

| | | | |
|---|---|---|---|
| 2,897,966 A | * 8/1959 | Humbert | 210/168 |
| 3,085,688 A | 4/1963 | Eberle | |
| 4,743,374 A | 5/1988 | Stifelman | |
| 5,036,996 A | * 8/1991 | Epstein | 210/316 |
| 5,230,812 A | * 7/1993 | Williams | 210/767 |
| 5,259,953 A | * 11/1993 | Baracchi et al. | 210/232 |
| 5,342,519 A | 8/1994 | Friedmann et al. | |
| 5,556,542 A | 9/1996 | Berman et al. | |
| 5,971,189 A | * 10/1999 | Baughmann | 220/288 |
| 6,223,919 B1 | * 5/2001 | Kuehn | 215/252 |

* cited by examiner

Primary Examiner—Matthew O. Savage
(74) Attorney, Agent, or Firm—Millen, White, Zelano & Branigan, P.C.

(57) ABSTRACT

A spin-on filter assembly is comprised of a plastic can and a plastic base wherein the plastic base is threaded into the can and secured in place by a rib on the base which seats within a V-shaped slot in the can. In order to have the base separable from the can so the filter may be rebuilt upon removing and replacing the filter element containing the filter media, the rib on the base has both a leading and trailing frustoconical surface. The trailing frustoconical surface on the base enables the base to cam the open end of the housing apart when the base is unscrewed from the can so as to allow the base to be separable from the can. In an alternative configuration, the base has a rib with a flat trailing surface that extends perpendicular to the base. Consequently, there is no base surface provided for caming the open end of the can apart by engaging complimentary frustoconical portion of the groove in the can.

18 Claims, 3 Drawing Sheets

SPIN-ON FILTER ASSEMBLIES

FIELD OF THE INVENTION

The present invention is directed to spin-on filter assemblies. More particularly, the present invention is directed to high pressure, spin-on filter assemblies which are optionally rebuildable.

BACKGROUND OF THE INVENTION

Spin-on filter assemblies are used for a number of purposes such as, but not limited to, filtering hydraulic fluid, filtering lubrication oil for machinery and internal combustion engines and for filtering transmission oil.

Primarily applications for such filters are high-pressure hydraulic systems which use spin-on filters. These filters have housings which are usually made of steel and are high volume items sold for both the original equipment and replacement market. Lately, there has been considerable interest in providing filter assemblies in which the filter housing is reusable. There are of course environmental concerns which arise when a used filter having hydraulic oil, or any other filtered liquid therein, is disposed of in its entirety because not only does the filter housing end up in a land fill, but also the filter media and liquid within the housing. In some situations, this is still acceptable, but in other situations it is not. Accordingly, there is a need for filter assemblies which are in effect rebuildable by removing the filter element which contains the filter media therefrom so that the only item which must be disposed of is the filter media itself. When the housing is opened, hydraulic fluid therein can be drained therefrom, refined and reused or disposed of in an acceptable manner, instead of being disposed of while contained within a filter housing.

Generally, it is preferable to have as few parts for a particular item as necessary. According to current practice, one spin-on filter assembly is manufactured for situations in which the entire assembly is disposed of and another spin-on assembly configuration manufactured for rebuildable spin-on filter assemblies. This results in an overall increase in cost.

SUMMARY OF THE INVENTION

In view of the aforementioned considerations, the present invention is directed to a filter assembly comprising an annular can having a first closed end and a second open end. The second open end has a coupling arrangement adjacent thereto for receiving a first base member which is not removable therefrom when coupled thereto, so as to provide filter assembly which is disposed of in its entirety with a used filter media inside, and a second base member which is removable from the can to provide a rebuildable filter assembly in which only the used filter media therein is disposed of.

More specifically, the present invention is directed to a filter assembly comprising a can having first and second ends, the first end being closed and the second end being open, wherein the can is adapted to receive a filter element. The can has an interior wall surface and coupling portion adjacent the second end of the can, wherein the coupling portion has a radially disposed, annular groove therein and an helically threaded section inboard of the groove disposed about a first axis. A base having openings therethrough adapted to provide inlet and outlet openings for fluid being circulated through the housing and through the filter element within the housing. The base has an externally threaded portion disposed about a second axis for receipt in the internal helically threaded section of the internal wall surface of the can with the first and second axes being coexistant. The base also has a radially projecting rib for receipt in the annular groove in the wall of the can to lock the base within the can, whereby the filter element is retained in the can between the first and second ends thereof. In accordance with a first arrangement, the base is permanently fixed with respect to the can and in accordance with a second arrangement the base is removable from the can so that the element can be replaced.

In order to facilitate interchangeability bases, the groove in the can, is V-shaped with one of the bases having a rib which compliments the V-shaped groove, allowing the first base to be unscrewed, and the other of the bases having a rib, which compliments only one surface of the V-shaped groove, so as to prevent the other base from unscrewing from the can.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
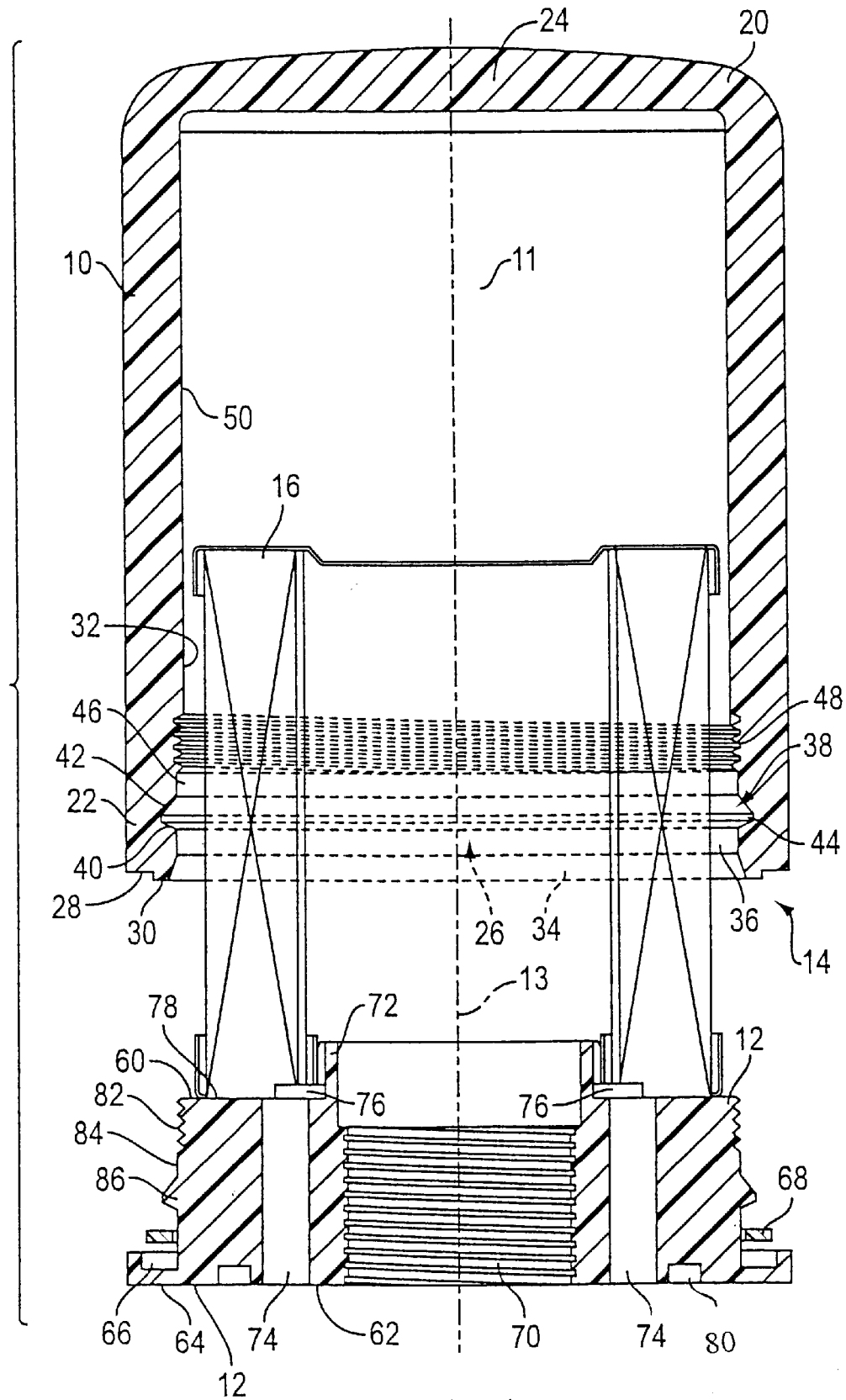
FIG. 1 is a side view elevation showing a can and base of a spin-on filter assembly separated from one another prior to being assembled in accordance with the principals of the present invention.
Figure 2:
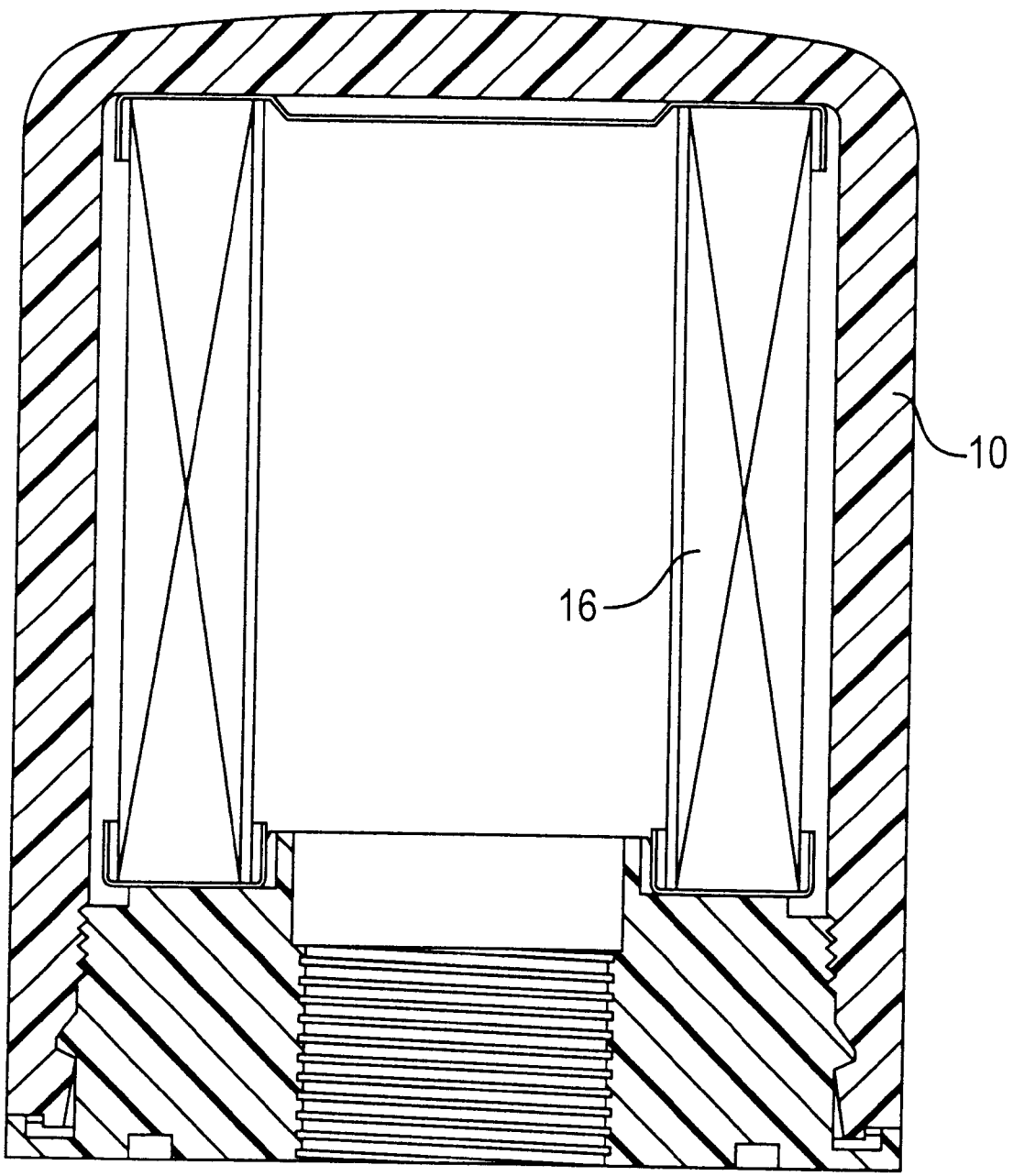
FIG. 2 is a side elevation of the spin-on filter of FIG. 1 showing the can and base assembled to hold a filter element within an enclosure formed thereby.

Referring now to FIGS. 1 and 2, there is shown a can 10 and a base 12 coaxial with axes 13 and 13', respectively, which when assembled form a housing 14 that encloses a filter element 16 having a filter media 17. Both the can 10 and base 12 are made of a durable impact and solvent resistant plastic material so as to form a robust filter assembly useful as a spin-on filter in high pressure systems, such as for example, high pressure hydraulic systems.

The can 10 has a first end 20 and a second end 22 with the first end 20 being closed with a dome 24 and the second end having an opening 26 therethrough. Adjacent to the second end 22 of the housing 14 there is an end surface 28 having an axially extending annular rib portion 30. Adjacent the annular rib 30 is an inner wall 32 which begins with inwardly tapering, frustoconical surface 34. After a short axial section 36, a substantially V-shaped groove 38 occurs, the V-shaped groove having the first frustoconical surface 40 a second frustoconical surface 42 separated by a very short cylindrical surface 44 that forms at the bottom of the groove 38. Adjacent the V-shaped groove 38 is a cylindrical surface 46 and just inboard of the cylindrical surface 46 is a threaded wall portion 48. The remaining portions 50 of the internal wall surface is a smooth cylindrical surface.

The base 12 has a first end 60 and a second end 62. First end 60 is inserted through the open end 26 of the can 10, while the second end 62 overlays the end surface 28 of the can with a flange 64, which flange has channel 66 in which is seated a sealing gasket 68.

The base 12 has central threaded bore 70 which is aligned with a collar portion 72 that projects from the first end 60 of the base and four, spaced openings 74 which are separated by four axially extending ribs 76 that form supports for holding the filter element 16 in spaced relation to the end surface 78 of the second end 60 of base 12. Just out-board of the four radial openings 74 is an annular groove; 80 which receives a gasket (not shown) in order to seal the base 12, and thus the filter assembly with a machine, such as a hydraulic machine (not shown).

Adjacent the end surface 78 of the base 12 there is a threaded portion 82, which is seen in FIG. 2 meshes with the threaded portion 48 on the internal wall 32 of the can 10. Just inboard of the threaded portion 82 there is short cylindrical portion 84 and beyond the cylindrical portion there is a locking rib 86. The locking rib 86 can have two configurations. The first configuration is shown in FIG. 3, and the second configuration is shown in FIG. 4.

Figure 3:
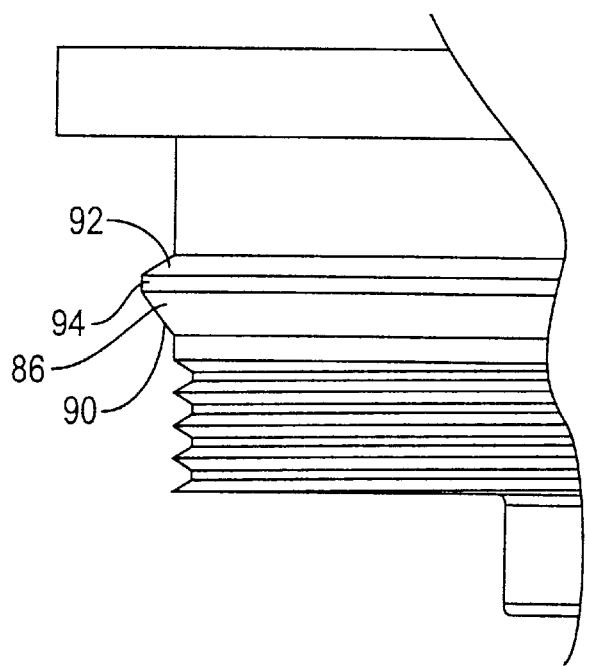
FIG. 3 is an enlarged side view showing a base with a separable lock rib in accordance with the first aspect of the present invention.

The rib 86 of FIG. 3 serves as a separable lock tab wherein the rib 86 has a first frustoconical surface 90 which diverges from the second axis 13' of the base 12 and a second frustoconical surface 92 which converges toward the axis 13'. These surfaces meet at a substantially cylindrical section 94 (which could also be slightly arcuate). The locking surface 90 has less of a lead angle then the arcuate surface 92 so that the lead angle entering the can 10 is less then that exiting the can. Consequently, more torque or force is required to assemble the filter then to disassemble the filter.

Figure 4:
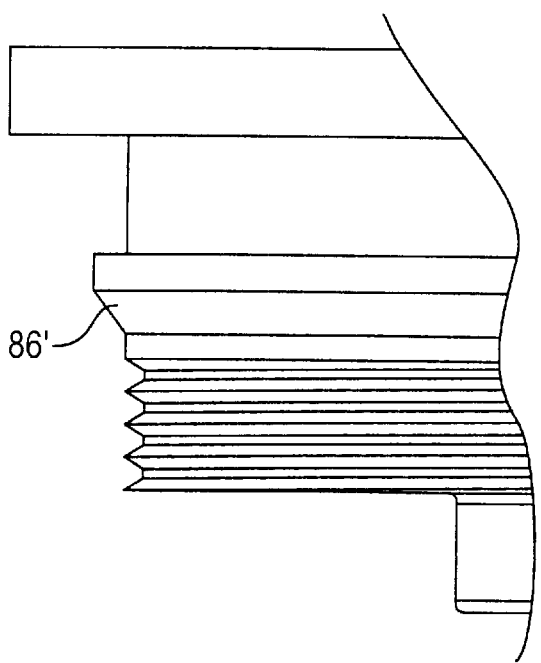
FIG. 4 is a side view showing the base with a rib providing an inseparable lock tab in accordance with a second aspect of the invention.

In the arrangement of FIG. 4, the frustoconical surface 92 of rib 86 in FIG. 3 has been replaced by the flat radially extending surface 96 of rib 86' which is perpendicular to the axis 13 of the base 12. Consequently, it is not possible to engage the frustoconical surface 40 of the groove 38 in can 10 with a camming surface that spreads the open end 26 of the can 10 slightly apart so that the base 12 can be unscrewed from the can. Consequently, rib 86' provides an inseparable locking tab because no lead angle is provided on the rib 86' for applying a camming force to spread the opening 26 of the can 10, so that upon turning the base 12, the base can retreat away form the can as the base is rotated with respect thereto. Consequently, by slightly altering the geometry of the rib 86, either a separable locking tab 86 is created or an inseparable locking tab 86' is created.

As is readily seen in FIG. 2, a robust filter assembly is created in which the can 10 is tightly closed by the base 12 with the annular rib 30 in surface 28 of the can compressing the sealing gasket 68 to seal the can while the rib 86 or 86' on the base mechanically locks to the can by seating in the V-shaped groove 38.

An option is thus provided for disposing of the filter element 16 (including the filter media 17) for separate disposal while rebuilding the filter assembly with a fresh filter element. Alternatively, the entire filter assembly may be disposed of if that is an acceptable alternative.

From the foregoing description, one skilled in the art can easily ascertain the essential characteristics of this invention, and without departing from the spirit and scope thereof, can make various changes and modificaitons of the invention to adapt it to various usages and conditions.

What is claimed is:

1. A filter assembly comprising:
    an annular can having a first end portion and a second end portion, the first end being closed and the second end being open, the can being adapted to receive a filter element a filter element;
    disposed in said can;
    an interior wall surface in the annular can, the interior wall surface having a coupling portion adjacent the second end of the can, the coupling portion having a radially disposed annular groove therein and a threaded section inboard of the groove disposed about a first axis;
    a base having openings therethrough adapted to provide inlet and outlet openings for fluid being circulated through the housing, the base having an external threaded portion disposed about a second axis for receipt in the internal threaded section of the interior wall surface of the can with the first and second axes being coaxial, the base further having a radially projecting rib for receipt in the annular groove in the wall of the can to provide an arrangement for locking the base within the can.

2. The filter assembly of claim 1 wherein the locking arrangement is inseparable without destroying the can or the base.

3. The filter assembly of claim 2, wherein the groove in the interior wall is substantially V-shaped in cross section with first and second frustoconical surfaces, wherein the radially projecting rib on the bas has a first frustoconical surface facing toward the threaded portion and a second surface facing away from the threaded portion, and wherein the second surface of the rib is spaced from the first frustoconical surface of the groove, whereby the second surface of the rib does not bear against the second frustoconical surface of the groove to cam the second end of the cam open.

4. The filter assembly of claim 3 wherein the second surface on the rib extends perpendicular to the second axis which is the axis of the base.

5. The filter assembly of claim 4 wherein the can and the base are made of plastic material.

6. The filter assembly of claim 4 wherein the second end portion of the can includes a sealing arrangement comprising an annular seal disposed between the base and the can.

7. The filter assembly of claim 6 wherein the seal is an annular gasket disposed between an axially facing, radially extending end surface on the can and an axially facing radially extending surface on the base.

8. The filter assembly of claim 7 wherein the surface on the base is disposed within an annular channel on the base.

9. The filter assembly of claim 1 wherein the second end portion of the can includes a sealing arrangement comprising an annular seal disposed between the base and the can.

10. The filter assembly of claim 9 wherein the seal is an annular gasket disposed between an axially facing radially extending end surface on the can and an axially facing radially extending surface on the base.

11. The filter assembly of claim 10 wherein the surface on the base is disposed within an annular channel on the base.

12. The filter assembly of claim 1 wherein the locking arrangement is separable without destroying either the can or the base.

13. The fiter assembly of claim 12, wherein the groove in the interior wall is substantially V-shaped in cross section with first and second frustoconical surfaces, wherein the radially projecting rib on the base has a first frustoconical surface facing toward the threaded portion and a second frustoconical surface facing away from the threaded portion, and wherein the second frustoconical surface of the rib is engageable with the second frustoconical surface of the V-shaped groove, whereby the second frustoconical surface of the rib bears against the second frustoconical surface of the V-shaped groove to cam the second end of the cam open and to allow the base to rotate so as to retreat away from the cam.

14. The filter assembly of claim 13 wherein the cam and the base are made of plastic material.

15. The filter assembly of claim 13 wherein the second end portion of the can includes a sealing arrangement comprising an annular seal disposed between the base and the can.

16. The filter assembly of claim 15 wherein the seal is an annular gasket disposed between an axially facing radially extending end surface on the can and an axially facing radially extending surface on the base.

17. The filter assembly of claim 16 wherein the surface on the base is disposed within an annular channel on the base.

18. The filter assembly of claim 1 wherein the can and the base are made of plastic material.

* * * * *

UNITED STATES PATENT AND TRADEMARK OFFICE
CERTIFICATE OF CORRECTION

PATENT NO. : 6,387,259 B1 Page 1 of 1
DATED : May 14, 2002
INVENTOR(S) : Mark Allen Roll It is certified that error appears in the above-identified patent and that said Letters Patent is hereby corrected as shown below:

<u>Column 4,</u>
Line 2, after "element" (first occurrance), insert -- ; --.
Line 2, after "element" (second occurrance), delete ";".
Line 26, change "bas" to -- base --.

Signed and Sealed this

Twelfth Day of August, 2003

JAMES E. ROGAN
*Director of the United States Patent and Trademark Office*